March 15, 1927.
C. FÉRY
1,621,481
ELECTRIC CELL
Filed Sept. 2, 1921
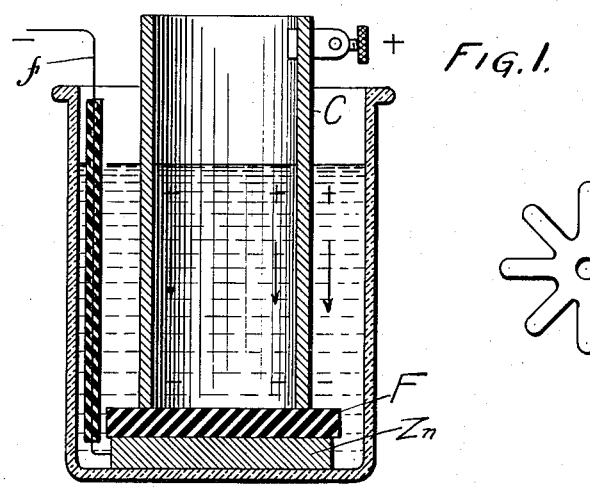
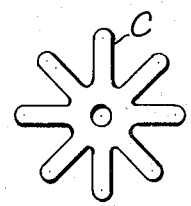
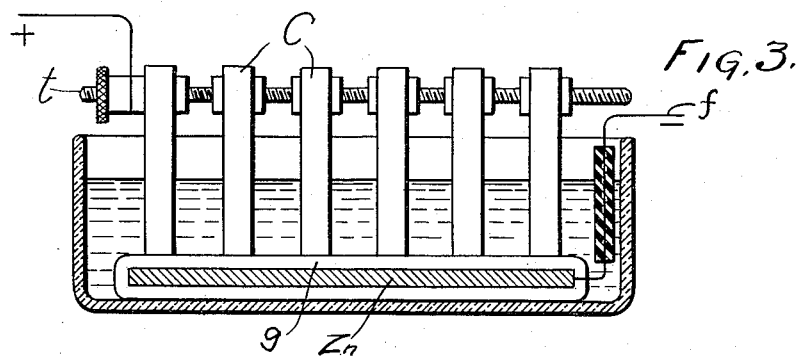
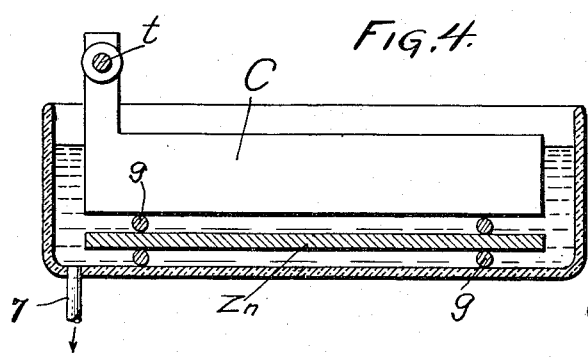
Inventor:
Charles Féry
by
Pennie, Davis, Marvin & Edmonds,
Attorneys.

Patented Mar. 15, 1927.

1,621,481

UNITED STATES PATENT OFFICE.

CHARLES FÉRY, OF PARIS, FRANCE.

ELECTRIC CELL.

Application filed September 2, 1921, Serial No. 498,092, and in France December 1, 1914.

Local or open circuit wear of the majority of cells is due to the convection of the liquid around the negative electrode made up most frequently of zinc. Now, the zinc salts thus formed have a greater density than that of the exciting liquid, which produces a continuous renewal of the latter around the negative electrode.

Furthermore, in the present form of zinc electrodes which dip vertically into the liquid it can be observed that it is on the surface of the latter that the zinc is cut or worn out. This is due to the presence of the oxygen of the air, which accelerates the dissolution of the zinc at that point.

The presence of the zinc at the surface of the liquid has the additional drawback of absorbing the oxygen which is dissolved in this liquid and which contributes to the depolarization of the carbon electrode.

It must be added also that the diffusion of the zinc salts at the upper portion of the liquid has as another detrimental effect the formation, in the pores of the positive carbon electrode, of the oxy-salts which choke up this electrode through the formation of crystals or hydrate of zinc oxide.

The zinc salts formed during the normal operation of the cell have a tendency through their density of collecting in a dense layer at the bottom of the cell jar.

If, therefore, the negative electrode is placed horizontally at the bottom of this jar, the zinc will bathe throughout its entire surface in a liquid of uniform composition and local actions will be avoided.

On the other hand, the upper part of the positive electrode, which occupies the rest of the height, will never be in contact with the saturated zinc solution thus formed and, its porosity remaining good, the depolarization will be a rapid one; for, if a zinc deposit should be formed, this would be in its lower portion, where the solution can contain a little zinc and where the density of the polarizing current is higher.

If, in order to get the ideas clearly fixed, the cell comprising zinc, carbon, chlorhydrate of ammonia, is taken to apply the conditions set forth above, this element will be made up as shown in the accompanying drawing in which Fig. 1 is a vertical sectional view of a cylindrical shaped cell embodying my invention; Fig. 3 is a similar view of a rectangular shaped cell showing a second modification of my invention, and Fig. 4 is a vertical sectional view taken at right angles to the plane of the section of Fig. 3, and Fig. 2 is a horizontal section of a modified form of a carbon electrode which may be employed in connection with the cell illustrated in Fig. 1 in place of the hollow-cylinder form of the positive electrode illustrated therein.

The zinc plate Zn (Fig. 1), placed in the bottom of the jar, is insulated from the carbon cylinder C by a felt washer F or a cross-piece of ebonite or any other insulating material. The contact is obtained from this zinc blade or plate by a wire $f$ insulated throughout its entire vertical portion by guttapercha or any other insulating material.

During the operation a piece of litmus paper occupying the entire height of the jar shows that the liquid underneath the felt becomes acid; there is formed chloride of zinc there; the light liquid, on the other hand, which occupies the upper portion of the cell, becomes alkaline; for it contains the ammonia of the exciting salt. The ammonia gas is therefore able to disengage itself freely and that without meeting the chlorine of zinc with which it would form the well-known crystals of ordinary sal-ammoniac cells.

It would obviously be possible to replace the electrode C which is tubular by a star-shaped piece of carbon or one with parallel plates for the purpose of increasing the depolarizing surface of the positive electrode (Fig. 2).

It would even be possible to combine this arrangement with the positive electrode depolarized by the manganese dioxide, while retaining withal the advantages specified above.

The lower part of the positive electrode being at a very slight distance from the negative one, the electrical resistance of the cell is very little.

It will also be observed that the lowering of the level of the liquid in the jar due to evaporation does not make the surface of these electrodes vary as in the case of the usual cells.

The rapid depolarization of the cells of this type is due to the electric currents which originate between the top and the bottom of the carbon electrode.

If Fig. 1 is referred to, it will be observed that after the operation the bottom of the electrode is strongly polarized, while the top, bathed by a liquid in contact with the air, is so very little. There is thus established an electric current between these two points, a current the intensity of which regulates the depolarization.

The intensity of these currents is still further increased by the fact that the positive electrode is in contact throughout its height with liquids of different densities which consequently are different in composition.

So that this depolarization may be a rapid one, it is also necessary for the horizontal section of the liquid to be great and the height of the cell to be small.

This remark leads to the construction of a high-capacity cell of which Figs. 3 and 4 are two vertical sections.

The L-shaped carbon plates are held by screws on the threaded rod $t$; their upper portion is paraffined.

The horizontal portions of the carbons rest on two small cords $g$ which surround the horizontal zinc plate Zn.

It is seen that the surface of the carbons and of the liquid exposed to the air is considerable and that the electric depolarizing currents only have a slight height of liquid to traverse; from this it results that the electric resistance which they have to overcome is very small. The intensity of these currents is therefore great and the depolarization is rapid.

By feeding these cells at the top and letting the saturated liquid formed at the bottom of the jar run out through a tube, the best type of flow-type cell is achieved.

Having now described my invention, what I claim as new and desire to secure by Letters Patent, is:

1. The improvement in the electric cells employing a soluble negative electrode horizontally disposed at the bottom thereof, and having an exciting liquid made up of a layer each of lower and higher density electrolyte, said negative electrode being covered with the higher density layer, which comprises, a positive electrode having the major portion thereof elongated and having its greatest dimensions extending horizontally, said positive electrode extending upwardly into contact with the air above the surface of the low density electrolyte and disposed in such manner within the exciting liquid and the upper portion of the high density electrolyte that local electric current may freely pass between the upper and lower portion of said positive electrode whereby the potential of the positive electrode is equalized and depolarization of the same is automatically effected.

2. The improvement in the electric cells employing a soluble negative electrode horizontally disposed at the bottom thereof, and having an exciting liquid made up of a layer each of lower and higher density electrolyte, said negative electrode being covered with the higher density layer, which comprises, a plurality of elongated positive electrodes having their horizontal dimensions greater than their vertical dimensions, said positive electrodes extending upwardly into contact with the air above the surface of the low density electrolyte and disposed in such manner within the exciting liquid and the upper portion of the high density electrolyte that local electric currents may freely pass between the upper and lower portion of said positive electrode whereby the potential of the positive electrode is equalized and depolarization of the same is automatically effected.

3. The improvement in the electric cells employing a soluble negative electrode horizontally disposed at the bottom thereof and having exciting liquid made up of a layer each of lower and higher density electrolyte, said negative electrode being covered with the higher density layer, which comprises a plurality of elongated positive electrodes having their horizontal dimensions greater than their vertical dimensions, a horizontally extending member by means of which said positive electrodes are supported and held in spaced relation said positive electrodes extending upwardly into contact with the air above the surface of the low density electrolyte and disposed in such manner within the exciting liquid and the upper portion of the high density electrolyte that local electric current may freely pass between the upper and lower portion of said positive electrode whereby the potential of the positive electrode is equalized and depolarization of the same is automatically effected.

CHARLES FÉRY.